United States Patent [19]

Zenner et al.

[11] Patent Number: 5,492,742
[45] Date of Patent: Feb. 20, 1996

[54] PACKAGES AND CONTAINERS COMPRISING SALICYLIC ACID CHELATES AS OXYGEN SCAVENGERS

[75] Inventors: Bruce D. Zenner, Alameda, Calif.; Fred N. Teumac, Conyngham, Pa.; Larrie A. Deardurff, Alameda, Calif.; Bert A. Ross, Conyngham, Pa.

[73] Assignee: W.R. Grace & Co.-Conn, New York, N.Y.

[21] Appl. No.: 296,761

[22] Filed: Aug. 26, 1994

Related U.S. Application Data

[62] Division of Ser. No. 124,993, Sep. 21, 1993, Pat. No. 5,364,555, which is a continuation of Ser. No. 37,497, Mar. 24, 1993, abandoned, which is a continuation of Ser. No. 693,462, Apr. 30, 1991, abandoned.

[51] Int. Cl.$^6$ .............. B32B 1/00; B29D 22/00; C09K 15/04
[52] U.S. Cl. .............. 428/35.2; 428/35.7; 428/36.6; 428/36.7; 206/524.3; 252/188.28
[58] Field of Search .............. 428/35.2, 35.7, 428/36.6, 36.7, 36.9, 403; 206/524.3, 524.4; 252/188.28

[56] References Cited

U.S. PATENT DOCUMENTS

| | | | |
|---|---|---|---|
| 4,279,350 | 7/1981 | King | 215/228 |
| 4,380,597 | 4/1983 | Erwied et al. | 524/109 |
| 4,542,010 | 9/1985 | Roman et al. | 423/579 |
| 5,021,515 | 6/1991 | Cochran et al. | 525/371 |
| 5,246,753 | 9/1993 | Koyama et al. | 428/36.7 |

OTHER PUBLICATIONS

Derwent Abstract JP 60063465 "Material Comprises a Composition Containing Salicylaldehyde—Ethylene Diamine Metal Complex" ECT. 1983.
CA 111(6):493395 "New Synthetic Colbalt Schiff Base Complexes as Oxygen Carriers" Chen et al. 1989.

Primary Examiner—Philip Tucker
Assistant Examiner—Joseph D. Anthony
Attorney, Agent, or Firm—Townsend and Townsend and Crew

[57] ABSTRACT

An oxygen scavenging packages and containers which comprise a composition of a carrier, such as a polymer, which is permeable to both oxygen and water or water vapor and an oxygen scavenging compound of an organic compound or salt thereof dispersed relatively uniformly throughout the polymer in an amount effective to act as an oxygen scavenger. The oxygen scavenging compound is a salicylic acid chelate or complex of a transition metal or a salt thereof. The oxygen scavenging composition is activated for scavenging oxygen by contact with water or water vapor which permeates into or through the carrier. A reducing agent of an ascorbate compound may be added to enhance the performance of the salicylic acid chelate or complex. The oxygen scavenging compound may be added to the composition in a dry state, and is inactive until activated for oxygen scavenging by contact with water or water vapor.

21 Claims, No Drawings

PACKAGES AND CONTAINERS COMPRISING SALICYLIC ACID CHELATES AS OXYGEN SCAVENGERS

This application is a division of application Ser. No. 08/124,993 filed Sep. 21, 1993 now U.S. Pat. No. 5,364,555, which is a File Wrapper Continuation of application Ser. No. 08/037,497 filed Mar. 24, 1993 (now abandoned), which in turn is a File Wrapper Continuation of application Ser. No. 07/693,462 filed Apr. 30, 1991 (now abandoned).

TECHNICAL FIELD

The present invention relates to a polymer composition containing oxygen scavenging compounds therein, for use in packaging beverages, foods, pharmaceuticals and the like. In particular, these polymer compositions have utility as liners or gasketing materials for crowns, closures, lids or caps of various containers such as bottles or cans to prevent oxygen ingress and to scavenge oxygen which is present inside the container, or contained in outside air leaking past or permeating through the polymer composition. These polymer compositions may also be used in the construction of the container, as the container material itself or as a barrier layer thereupon or therein, to prevent oxygen ingress therethrough or to scavenge oxygen therein.

BACKGROUND ART

In packaging oxygen sensitive materials such as foodstuffs, beverages, and pharmaceuticals (collectively "products") oxygen contamination can be particularly troublesome. Care is generally taken to minimize the introduction of oxygen or to reduce the detrimental or undesirable effects of oxygen on the foodstuff or beverage.

Molecular oxygen ($O_2$) can be reduced to a variety of intermediate species by the addition of one to four electrons; these species are superoxide, hydroxy radical, hydrogen peroxide, and water. $O_2$ and water are relatively unreactive: the three intermediate species are very reactive. Also, $O_2$ can be activated to single electron state oxygen (which can undergo subsequent reduction to the more reactive oxygen species) by irradiation, or by the presence of catalytic agents. These reactive oxygen species are free radical in nature, and the oxidative reactions in which they participate are therefore autocatalytic.

Carbon-carbon double bonds are particularly susceptible to reaction with the intermediate species. Such carbon-carbon bonds are often found in foods and beverages, pharmaceuticals, dyes, photochemicals, adhesives, and polymer precursors. Virtually any product which has complex organic constituents will contain such carbon-carbon double bonds or other oxygen reactive components, and hence can undergo oxidative reactions. Thus, if the oxidation products adversely affect the performance, odor or flavor of the product, then removing the oxygen which is present (either dissolved in or trapped with the product), preventing oxygen ingress, or inhibiting the reactions of oxygen will benefit the product.

A number of strategies exist to deal with oxygen as a contaminant. The most basic is simply to remove oxygen from the product by vacuum or by inert gas sparging, or both. Such systems are used in boiler water treatment, the orange juice and brewing industries, and in modified-atmosphere packaging of food products. This technology, while somewhat equipment intensive, can remove about 90–95% of the oxygen present in air from the product (or its container) prior to or during packaging. However, this removal of the remaining 5–10% of oxygen using this approach requires longer times for vacuum treatment and/or sparging and increasingly larger volumes of higher and higher purity inert gas which must not itself be contaminated with trace levels of oxygen. This makes the removal (by such methods) of the last traces of oxygen expensive. A further disadvantage of these methods is a tendency to remove volatile product components. This is a particular problem with foods and beverages, wherein such components are often responsible for some or all of the aroma and flavor.

Herein, the term "oxygen scavenger" means materials or chemical compounds which can:

a) remove oxygen from the interior of a closed package by reacting or combining with entrapped oxygen or with oxygen that is leaking into the package interior past the package/closure sealant or gasket;

b) prevent or reduce the perfusion of oxygen through the gasketing/sealant materials between container and closure;

c) prevent or reduce the perfusion of oxygen through the materials of the package/closure itself by incorporation of the oxygen scavenger into the materials of which the container/closure is/are made;

d) prevent or reduce the perfusion of oxygen through the material of the package/closure itself by incorporation of the oxygen scavenger into one or more layers of a multilayer container/closure construction.

The term "antioxidants" as used herein means materials or compounds which, when added to the foodstuff or beverage itself, slow the rate of oxidation or otherwise reduce the undesirable effects of oxidation upon the foodstuff or beverage.

In beer, for example, it has been known since the 1930's that oxygen in beer adversely affects its flavor and stability. Amounts of oxygen as low as 0.1 to 0.2 ml per 355 ml container will, over time, cause darkening of the beer, an increase in chill-haze values and significant taste changes. Oxygen's effect on beer is so strongly detrimental that many brewers go to great lengths to remove it from the bottle during the filling process. One usual technique is to (1) remove the air (via vacuum) from a clean bottle; (2) fill the bottle with $CO_2$; (3) flow the beer down the bottle wall into the bottle thus displacing the $CO_2$; and (4) finally, to squirt a jet of high-pressure deoxygenated water into the bottle to cause the beer to over-foam just as the cap is put on (attempting thereby to displace the remaining headspace gases with the beer's own $CO_2$). In addition, production lines are run slowly, to minimize introduction of air (21% $O_2$) into the headspace just before capping. All this is expensive, and usually reduces the total $O_2$ concentration in the headspace to only about 200–400 parts per billion: the desired level is as close to zero as possible, but certainly below about 50 ppb. The 200–400 ppb achieved in the packaged product by careful brewers corresponds to approximately 50–100 microliters of oxygen per 355 ml bottle. Even this small quantity of oxygen is still considered to be one of the major limitations on quality and shelf life of beer today.

Many other food products suffer similar oxygen-mediated degradation; for example, individual portions of prepared foods are marketed in containers made of plastics, and air entrapped therein, and leaking or perfusing into the package after processing, is an acknowledged industry problem. This leakage or perfusion is often especially true for packages made entirely of plastics, because many plastics with otherwise desirable properties are relatively permeable to oxygen. Incorporation of the present invention into the bulk of such plastics, or into one or more layers of a multilayer package, could be beneficial in reducing or eliminating such perfusion. Among obvious benefits of such applications of the invention is extended shelf life.

None of the above techniques remove or control (a) oxygen dissolved in the product (which will outgas into the headspace as the enclosed system comes to equilibrium), or (b) oxygen leakage into the package past the gasket/container interface, or (c) oxygen permeating through the gasket into the interior of the package, or (d) oxygen permeating through the container itself into the package. The present invention also aids in removal of $O_2$ from these other 3 sources. Furthermore, it is known that free oxygen inside a package may yield very rapid degradation of the product, consequently a desired property of any scavenger is to remove most of the free oxygen as quickly as possible (i.e., ultimate $O_2$ absorption capability is subordinate to fast uptake kinetics).

Antioxidants (such as sulfur dioxide, trihydroxy butyrophenone, butylated hydroxy toluene and butylated hydroxy anisole) and oxygen scavengers (such as ascorbic acid, isoascorbic acid and glucose oxidase-catalase) have been used in an attempt to reduce the effects of oxygen contamination on beer (See, e.g., Reinke et al., "Effect of Antioxidants and Oxygen Scavengers on the Shelf-life of Canned Beer, "A.S.B.C. Proceedings, 1963, pp. 175–180, Thomson, "Practical Control of Air in Beer", Brewer's Guild Journal, Vol. 38, No. 451, May, 1952, pp. 167–184, and von Hodenberg, "Removal of Oxygen from Brewing Liquor," Brauwelt International, III, 1988, pp. 243–4). The direct addition of such agents into beer has several disadvantages. Both sulfur dioxide and ascorbates, when added to beer, can result in production of off-flavors thus negating the intended purpose of the addition. Many studies have been conducted on the effect of such agents on the flavor of beer. (See. e.g., Klimowitz et al., "The impact of Various Antioxidants on Flavor Stability," MBAA Technical Quarterly, Vol. 26, pp. 70–74, 1989 and Gray et al., "Systematic Study of the Influence of Oxidation on Beer Flavor, " A.S.B.C. Proceedings, 1948, pp. 101–112) Also, direct addition of such compounds to a food or beverage requires stating on the label that the product contains the additive. This is somewhat undesirable in today's era of "fresh" and "all-natural" products.

It is also known in the art to prepare plastic containers (e.g., for beer, other beverages and various foods) wherein a wall comprises, or includes a layer which comprises, a polymer, an oxidizable component having oxygen-scavenging properties, and a metal catalyst, for binding any oxygen penetrating the container wall (See, e.g., Folland, the OXBAR Super-Barrier System: A Total Oxygen Barrier System for PET Packaging, "EUROPAK" '89, Oct. 30–Nov. 1, 1989, and European Patent Application 301,719). Also, U.S. Pat. No. 4,048,361 discloses a food container having at least one barrier layer which contains an oxygen "getter," while U S. Pat. No. 3,586,514 discloses a thin wall polyvinyl chloride container wherein the plastic contains a quantity of an antioxidizing agent to reduce oxygen permeability therethrough, and Japanese patent application 58-160,344 discloses hollow moldings of a polyethylene terephthalate ("PET") with a meta-xylylene group containing polyamide resin. The containers described in these references are described as oxygen barriers which prevent or reduce the transmission of oxygen through the wall and into the container. Such products are generally more expensive than glass containers and are less likely to be recycled than glass or aluminum containers.

Attempts have been made to incorporate oxygen scavenging systems in a container crown or closure. For example, U.S. Pat. No. 4,279,350 discloses a closure liner which incorporates a catalyst disposed between an oxygen permeable barrier and a water absorbent backing layer. Another closure is disclosed in UK Patent Application 2,040,889. This closure is in the form of a stopper molded from ethylene vinyl acetate ("EVA") having a closed-cell foamed core (which may contain water and sulfur dioxide to act as an oxygen scavenger) and a liquid impervious skin. Also, European Patent Application 328,336 discloses a preformed container closure element, such as a cap, removable panel or liner, formed of a polymeric matrix containing an oxygen scavenger therein. Preferred scavengers include ascorbates or isoascorbates, and their scavenging properties are activated by pasteurizing or sterilizing the element after it has been fitted onto a filled container. Similarly, European Patent Application 328,337 discloses a sealing composition for a container closure comprising a polymeric matrix material which is modified by the inclusion therein of an oxygen scavenger. These compositions may be in fluid or meltable form for application to a closure or to be present as a deposit on the closure in the form of a closure gasket. Ascorbates or isoascorbates, alone or in combination with sulfites, are preferred oxygen scavengers. Again, the scavenging properties of these compounds are activated by pasteurizing or sterilizing the deposit when sealing a container with the gasket on a closure or metal cap.

Ferrous oxide has been used commercially as an oxygen scavenger for food applications. It is currently manufactured in sachets or packets by a number of firms including Mitsubishi Gas Chemical, Inc., which markets it in a product known as AGELESS™. (See, e.g., European Packaging Newsletter and World Report, Vol. 21, No. 7, July, 1988.) Such products may also contain ascorbates as an oxygen scavenging agent, per U.S. Pat. No. 4,752,002, which discloses a packaging train of a plurality of such packets. Also, U.S. Pat. No. 4,524,015 discloses the use of a granular mixture of an ascorbate or ascorbic acid, an alkali metal carbonate, an iron compound, carbon black, and water, and U.S. Pat. No. 4,384,972 discloses a foodstuff freshness keeping agent of a particulate composition that contains a salt of a metal, an alkali substance, a sulfite or other deliquescent compound, and optionally, ascorbic acid or a salt thereof.

While such products are effective at removing oxygen from within packages of breads, cookies, pasta, coffee and other relatively dry foodstuffs, they have significant. drawbacks. They (a) are hygroscopic and water soluble to some extent, (b) function less effectively in high $CO_2$ environments, (e.g, beer containers), (c) in order to preserve their activity, they must be carefully sequestered from air (or other oxygen-containing environments) until use, and (d) they require a sachet or packet, often of multilayer construction, for proper storage and handling of the oxygen scavenger.

U.S. Pat. Nos. 4,536,409 and 4,702,966 each disclose a multilayer wall construction for a polymeric container to be used to pack comestibles, wherein outer and inner layers are structural and protective layers: positioned therebetween are materials designed to control the unwanted permeation of oxygen. Preferably, the outer and inner layers are olefinic and resistant to the transmission of water vapor at room temperature, but at elevated temperatures, they permit water vapor to permeate into the oxygen absorbing system to trigger such system to an active state which is capable of absorbing oxygen. While this construction is useful from the standpoint of retaining the oxygen absorbing system in a dormant state until it is needed, such construction requires heat to render the inner and outer layers permeable to water vapor which can trigger or activate the oxygen absorbing system.

Consequently, there is a need for a material or product which can rapidly reduce oxygen levels inside a package of products which are wet or moist (or which are capable of generating moisture inside their packaging) without adversely changing taste, aroma, or functionality of such packaged foodstuffs, beverages and pharmaceuticals. Persons skilled in the art have considered the addition of various agents into the packaging of such products in an attempt to meet this need.

Japanese patent application 61-238,836 discloses a packaging film made from a thermoplastic such as low density polyethylene ("PE"), which includes ascorbic acid alone or in combination with an aliphatic polycarboxylic acid. This film is disclosed as having good gas barrier properties.

Japanese patent application 54-022,281 discloses a fruit tray made of a thermoplastic foam base having a thin layer of ascorbic acid or erythorbic acid (or one of their alkali metal salts) on the face of indentations in the tray upon which the fruit is to be placed.

New oxygen absorbing and scavenging materials are also being developed by Aquanautics, Inc., Alameda, Calif. (See Packaging Technology, "Oxygen Eliminator Extends Shelf Life," 1989 and "Extending the Life of a Bottle of Beer," New York Times, Mar. 29, 1989). These materials are transition metal complexes, particularly (but not exclusively) those complexes formed between transition metals and "polyalkylamines" (as disclosed in U.S. Pat. No. 4,959,135, which is expressly incorporated herein by reference thereto), as well as those complexes formed between transition metals and "macrocyclic amines" (as disclosed in U.S. Pat. No. 4,952,289, which is expressly incorporated herein by reference thereto).

These "amine+metal" complexes can bind ligands such as oxygen and can be used as oxygen scavengers in packaging. The complexes either do not form or do not become activated (i.e., cannot, or do not, bind oxygen) until the amine and metal are together exposed to water or water vapor. The ingredients of the complex can be mixed and used either free, or immobilized on or within a support inter alia, on or mixed with silicone rubber or with a polymer such as polyvinyl chloride ("PVC"), EVA, polypropylene("PP"), PE or polyurethane (See, e.g., U.S. patent application Ser. No. 07/317,172, filed Feb. 28, 1989, the content of which is expressly incorporated herein by reference thereto, wherein one use for such complexes is as an oxygen scavenger in sealing compositions and structures for beer bottle crowns).

Salicylic acid complexes and their reactivities towards oxygen are generally known and are described in Zanello et al., *Inorganica Chim. Acta* 1983, vol. 74, pp. 89–95 and Cini et al., *Inorganica Chim. Acta* 1984, vol. 88, pp. 105–113.

U.S. Pat. No. 4,287,995 discloses a sealing member for a container which is used to preserve aqueous liquids therein. This sealing member is mounted on the cap or stopper of the container on the portion facing the contents. The sealing member contains an oxygen absorbent which is separated from contacting the contents of the container by a film which has a plurality of fine openings such that it is gas-permeable but water-impermeable at one atmosphere pressure.

U.S. Pat. No. 4,510,162 discloses an oxygen absorbent composition comprising iron particles, yeast and moisture, which is mounted on a suitable carrier and adapted to be mounted in a closable container for removing oxygen therefrom.

U.S. Pat. No. 4,756,436 discloses a construction for an oxygen scavenging composition to be installed in a cap upon a liquid substance containing vessel. This construction includes an upper, vacant compartment, a lower compartment containing the oxygen scavenger, and a partition therebetween. The partition is made of single or plural sheets of gas permeable liquid-proof material to provide a barrier between the oxygen scavenger and the liquid substance.

Current crown liner technology includes the in situ molding of a thermoplastic liner material directly in the crown which will later be used for bottling beer or other beverages. Such liners are primarily made of PVC in the United States and of thermoplastics which do not contain chlorine (such as EVA or PE) in Europe and Japan.

A conventional apparatus for making lined crowns is the Za-Matic® Model 1400A (available from Zapata Industries, Inc.) described in U.S. Pat. Nos. 3,135,019, 3,360,827 and 3,577,595. The liner compositions may be based upon plastics such as, for example, PVC, EVA, or PE, and may include those of U.S. Pat. No. 3,547,746, for example.

PVC compositions, with or without additives as stabilizers or for imparting certain properties, are known in the art. For example, U.S. Pat. No. 4,380,597 discloses a stabilized thermoplastic composition of PVC (or mixed polymers) which may include ascorbates or gluconates as stabilizer additives. These stabilizers are added not to absorb oxygen from inside packages made of the polymer, but to prevent breakdown of the polymer itself U.S. Pat. No. 4,211,681 discloses shaped articles (e.g., films or tubes) which include high molecular weight poly (ethylene oxide) polymers with stabilizers of ascorbic acid, 2,3-butyl hydroxyanisoles, and the like.

Japanese patent application 62-215,010 discloses a deodorizing fiber obtained by treating thermoplastic fibers with inorganic particles of divalent ferrous iron and L-ascorbic acid. U.S. Pat. No. 4,278,718 discloses a sealing composition for beverage containers consisting essentially of a vinyl chloride resin, a plasticizer, and a metal oxide.

Today there is a need for oxygen-scavenging thermoplastic compositions for use in oxygen-scavenging systems for packaging beverages, foods, pharmaceuticals and other products. The oxygen-scavengers in such systems should rapidly reduce oxygen levels within the package (and/or in the goods themselves), as well as prevent oxygen ingress into the package. There is a particular need for such systems where the internal environment of the package is (or can become) wet or moist. Most advantageously, the oxygen-scavengers of such systems would remain inactive until after the product is packaged. One particular need for such a composition is a liner for beer bottle crowns wherein the oxygen-scavenging properties of the liner do not become active until after the bottle is crowned.

Other particular uses of such a composition may involve dry products packaged under low relative humidity. In such cases, the compositions of this invention may be activated by application of water or water vapor to the composition itself immediately prior to sealing of the container. For example, in the case of a dry product to be sealed in a container by means of a screw-on lid with a gasket comprising a composition of this invention, activation moisture might be provided by a water-mist spray, by dipping in water, by exposure of the lid to a water-vapor-saturated atmosphere, or by incidental exposure to steam during pre-capping sterilization. The present invention provides certain compositions and formulations as solutions to these general needs, and specifically for bottled beverages including beer.

SUMMARY OF THE INVENTION

This invention teaches the preparation and use of certain oxygen scavenging materials dispersed in various carriers, such as polymers or plastics, and used in packaging as oxygen scavenging compositions. These compositions, by virtue of novel and unexpected increases in oxygen uptake rates of the oxygen scavenging material, are useful in preventing deterioration or reaction of the packaged substances due to exposure to oxygen in the package.

In one embodiment of the invention, the oxygen scavenging composition comprises a carrier, such as a polymer, preferably a thermoplastic polymer, which is permeable to oxygen and water or water vapor; and a transition metal complex or chelate of a salicylic acid or a salicylate salt, whether or not substituted, dispersed relatively uniformly through the carrier and added in an amount sufficient to act as an effective-oxygen scavenger.

The transition metal of the chelate is preferably iron, copper, cobalt, or nickel; most preferably it is either iron or copper. The transition metal used to make the chelate or complex may be supplied as a simple salt, such as iron or copper chloride, iron or copper sulfate, iron gluconate, nickel sulfate, or cobalt chloride, but is present as part of the chelate or complex.

It is also possible, and in some cases preferred, to include a reducing agent, such as an ascorbate compound, in the polymer in an amount sufficient to enhance, preserve or augment the oxygen scavenging properties of the transition metal chelate or complex. Ascorbic acid, in its D- or L- form, or a derivative, analog or salt thereof, may be used as a preferred reducing agent, since it also has oxygen scavenging properties.

Preferred polymers for use as carriers include polyolefins, PVC, polyurethanes, polyamides and elastomers. PVC, EVA and PET are typically utilized, but PE, PP, and other olefins, various thermoplastic (or other) polyurethanes, elastomers, such as isoprene rubber, nitrile rubber, chloroprene rubber, silicone rubber, or other rubber analogs, and other thermoplastic materials such as chlorinated polyethylene ("CPE"), SURLYN™, or various combinations or mixtures thereof, are acceptable. In addition, sprayed or dipped coatings of epoxies, polyesters or other conventional coating materials are useful as carriers for the oxygen scavenging compositions of the invention.

The oxygen scavenging material is uniformly dispersed in and throughout the carrier by a direct mixing technique. Advantageously, the oxygen scavenging material is mixed or blended into the carrier in a dry state. The oxygen scavenging capabilities of these compositions are later activated by contact with water or water vapor which permeates into or through the carrier. The water vapor may be provided by the package contents or, for dry contents, may be introduced separately before sealing the package. The most preferred polymers or other materials which may be used as the carrier are those which are pervious to water vapor at room temperature, so that exposure to elevated temperatures is not necessary to activate the oxygen scavenging capabilities of the composition.

Another embodiment of the invention relates to a package (for, e.g., a foodstuff, beverage, or pharmaceutical product) comprising means for supporting or retaining the product, and an oxygen scavenging composition material in contact with the product (or in contact with the environment between the product and the package) for scavenging oxygen therefrom so as to avoid detrimental effects to the performance, odor or flavor properties of the product.

The oxygen scavenging composition may be present on an inside surface of the product supporting or retaining means. This means can be in the form of a carrier film, with the oxygen scavenging composition being dispersed relatively uniformly throughout the carrier film. If desired, one or a plurality of polymer films may be used, with at least one layer of adhesive or binder therebetween, with the oxygen scavenging composition being present in at least one of the polymer films or layers. Also, the oxygen scavenging composition can be applied as a coating or lining upon the inside surface of the product supporting or retaining means to function as a barrier to oxygen permeation.

The invention also relates to containers for water-containing foodstuff, beverage, chemical or pharmaceutical products comprising means for retaining the product and having at least one opening therein for filling or dispensing of the product; a member for closing the opening and preventing escape of the liquid product when not desired; and a liner or gasket comprising one of the oxygen scavenging compositions described above and being positioned adjacent the closing member. Preferably, the retaining means is a can, jar or bottle, the closing member is a crown or closure, and the polymer of the liner or gasket comprises a polyurethane, PVC, EVA or PE. The retaining means may also be a metal can or glass jar, with the closing member being a lid therefore. In this variation, the oxygen scavenging composition may be applied to the lid in the form of a ring, a spot, or coating. Also, the oxygen scavenging composition may be applied to the interior of the can as a coating, generally of an epoxy or polyester carrier. When a metal can is used, it is usually provided with a seam. Thus, it is possible to apply the oxygen scavenging compositions of the invention as a sealant in or upon the seam to prevent oxygen ingress into the can through the seam.

Another embodiment of the invention relates to an oxygen scavenging container which may be made from any one of the compositions of the invention described above. Yet another embodiment relates to a multilayer container or closure where one or more layers comprise the oxygen scavenging compositions of the invention. Also, these compositions may be used as a sealant for, or in an article trapped by the closure methodology for packaging which does not include an identifiable closure which is differentiable from the material of the container itself.

DETAILED DESCRIPTION OF THE INVENTION

The oxygen scavenging compositions of the invention include certain preferred combinations of oxygen scavenging and reducing agents which are added to and dispersed in and throughout a carrier for these agents.

The most preferred oxygen scavenging agent of the invention is a transition metal (preferably iron) chelate of salicylic acid, in particular $Fe^{+++}/Sal_3/3Na^+/3NaCl$ where $Sal=$

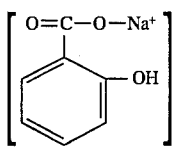

Instead of this material, a wide variety of other salicylates can be used, including

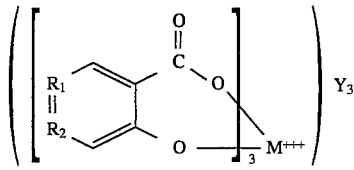

where M is a transition metal, Y is an alkali metal, and $R_1$ and $R_2$ are carbon atoms or part of a benzene ring, or

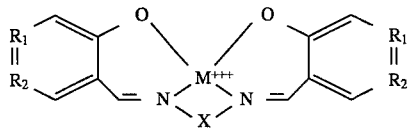

where M is a transition metal, X is $(CH_2)_m Z(CH_2)_m$ with m being an integer, Z is N or C=C with the proviso that if Z is N then N is also bonded to M, and $R_1$ and $R_2$ are carbon atoms or part of a benzene ring.

These salicylates are effective as oxygen scavengers because they react with oxygen to become oxidized. In addition, selection of a transition metal in its lower oxidation state enhances the oxygen scavenging performance of these chelates. As noted above, if transition metals in their higher oxidation state are utilized in these chelates, the oxygen scavenging properties of the chelate can be further enhanced by the incorporation of a reducing agent into the composition. Again, the ascorbates are preferred reducing agents for the reasons given above. The ascorbates also act as a preservative for the chelate. In addition, the ascorbates can be included to augment the oxygen scavenging of the chelates.

The term "ascorbate compound" is used to include ascorbic acid in either its D or L form and any derivative, analog or salt thereof, including erythorbic acid. In particular, D- or L- ascorbic acid, and their sodium, potassium or calcium salts, or fatty acid derivatives may be used in this invention. Certain of the above, especially the sodium ascorbate salts, are particularly preferred since these materials are widely accepted for contact with food and have achieved "Generally Recognized As Safe" (or "GRAS") status with the U.S. Food and Drug Administration for such applications.

An advantage in practicing this invention is that the oxygen scavenging compositions do not become active for scavenging oxygen until they contact water or water vapor. Thus, the selected composition or compound is dispersed relatively uniformly throughout a carrier which is permeable both to oxygen and water or water vapor. Thereafter, when the carrier is used in an application adjacent to or in the vicinity of a water bearing foodstuff, pharmaceutical, chemical, or beverage, water or water vapor will permeate into the carrier and thus activate the ascorbate compound for removal of oxygen. By retaining the carrier in a dry environment prior to use, the oxygen scavenging compound will remain essentially dormant until activated. For dry products, the oxygen scavenging ability of the compound or composition may be activated by exposure to non-product water or water vapor before sealing the container.

A wide variety of carriers (or mixtures thereof) may be used in accordance with the teachings of the present invention. For use in applications such as crown or closure liners, the carrier is preferably a polymeric thermoplastic, such as PVC, EVA, PET, PE or PP, or a polyurethane. As noted above, PVC liners are well known for use in crowns as described in the production of same utilizing the Za-Matic machines. There is also well-known technology for making aluminum or plastic closures containing EVA liners. Thus, one of the preferred uses of the compositions of the invention is as a liner or gasket in a crown or closure for capping a beverage bottle. Entire closures may also be made of plastics containing the compositions of the invention (e.g., all-plastic screw-on threaded caps for soft-drink bottles, and the like).

In addition to its use as a crown or closure liner, the compositions of the invention may also be used in the form of a film for packaging materials. Such films are preferably made of PE, PP, PVC, or SURLYN™, a DuPont Corporation polymer. The oxygen scavenging compositions of the invention could also be used for forming containers; in this situation the polymer is preferably PET, PVC, or PE. Other polymers which are contemplated by the invention include silicones as well as elastomers such as isoprene rubber and its rubber-like analogs: nitrile rubber, chloroprene, EPDM, etc. Silicone rubber can also be used in some situations. The only requirements of the polymer are that it can be processed in a manner which allows the oxygen-scavenging composition to be dispersed relatively uniformly throughout and that the polymer be permeable to oxygen and water or water vapor.

Another application of the compositions of the invention would be as a sachet, packet or pellet which is mounted on a support and then attached to a crown or other container lid or to the container itself in the form of an article, such as a ring or spot, or as a coating. Thus, the compositions can be applied to a wide variety of jar lids and caps which are used for retaining food substances therein. Again, however, one preferred use of the compositions of the invention is in connection with foodstuffs which contain water so that the oxygen-absorbing compounds may be activated by contact with water or water vapor which permeates into the polymer. The compositions may also be used with dry products by pre-activating the composition via exposure to water or water vapor shortly before sealing the container.

Other uses for the compositions of the invention include use on metal (i.e., aluminum or tinplate) cans for beverages. In these cans, the lid is attached by a seam, and a sealant compound is used in the seam to prevent the ingress of air into the can. The oxygen scavenging compositions of the invention may be applied to this seam as, or incorporated into, the sealant. The compositions of this invention may also be applied as a coating on the inside of the can or can lid.

It is also contemplated to prepare plastic bottles or other styles of containers (e.g., tubs, cans, etc.) from or incorporating the compositions of the invention. In particular, PVC and PET are the preferred polymers for this embodiment, and the oxygen scavenging compound and catalyzing agent would be dispersed uniformly throughout the PVC or PET in one or more layers comprising the container. Also, the composition can be applied between the layers, upon one of the layers by means of an adhesive, or into the adhesive which holds layers together. When the compositions are applied into the PVC or PET resin, the containers can be molded in conventional manners known in the art, e.g., die forming, compression forming or the like.

Another preferred use of the composition of the invention is as a gasket or liner applied to an aluminum or plastic closure or metal crown for plastic or glass bottles. Another preferred use is as a gasketing or sealant material for use in establishing the closing mechanism of containers which have no closing member differentiable from the material of the container (e.g., potato chip bags).

For crown liner manufacture, the disclosure of U.S. Pat. No. 3,547,746 is useful and thus is expressly incorporated herein by reference thereto. The PVC resins which are preferred for use as the polymer in the oxygen scavenging compositions of the invention are set forth in the patent at column 2, lines 35 through 47.

This patent also discloses suitable plasticizer compounds which may be used with the thermoplastic resin along with preferred ranges thereof. In this invention, it is preferred to use an amount of plasticizer ranging from about 60 to 90 parts by weight based on 100 parts by weight of the polymer for crown liners. Depending upon the specific product to be made, the amount of plasticizer can vary from 10 to 120 parts. Specific plasticizers for PVC crown liners are recited in column 5, lines 49 through 53 of the patent. Other conventional additives such as stabilizers, lubricants, pigments, etc. are well known in the art and may optionally be used in the compositions of the present invention.

In addition to this crown liner manufacturing method, which is generally used for PVC, EVA or PE liners, many other devices can apply liners by plastisol spin-lining or various hot molding techniques. The present invention is easily applicable to both gasketing/coating/sealing materials (such as beer bottle crown liners) and to containers or closures comprised primarily of plastic materials. Many plastic materials used in such applications for their other desirable properties are undesirably pervious to oxygen. For example, individual portion packages of foods are commonly packaged in plastic containers comprising one or multiple layer(s) of plastic and or adhesives ("tie layers"), which layers are selected for various properties. This invention may be practiced in the construction of such a container (and the container's performance improved thereby) by the use of an oxygen scavenging material of the invention as (or as a component of) one or more layer(s) in the container (or in the raw materials of which a single-layer container is made). For example, a multiple-layer package might consist of a decorative, easily-printable, high-temperature stable outer layer (which is undesirably pervious to oxygen), an all-white (for esthetic purposes) inner layer, and one or more center layer(s) which either is/are made entirely of, or incorporate(s) an oxygen-scavenging composition of this invention. The layer(s) comprising the oxygen scavenger may be otherwise similar to, or very dissimilar to, adjacent layers. The oxygen scavenging composition of the invention may also be incorporated into the materials used as an adhesive between adjacent layers of plastic or incorporated into the adhesive which holds adjacent layers together.

Other embodiments of the present invention are readily apparent to those skilled in the packaging arts, all of which embodiments fall within the scope of the invention and are intended to be included therein. For instance:

1) many packages are constructed of transparent plastic films so that the product may be seen by the purchaser. Such packages usually have printed decoration incorporated therein, often actually printed on a central layer of a multi-layer film so as to avoid the possibilities of both ink-contamination of package contents and rubbing off of the printing during handling. An oxygen-scavenging composition of the present invention might be unobtrusively incorporated into such a package by being printed onto the central layer underneath the decorative or informative printing.

2) For other packages which do not comprise a separate closure (e.g., sterile or refrigerated "brick-packs" such as often used for fruit juices and the like; gable-top packages such as milk cartons; containers made to have the contents expressed therefrom and not be resealed, such as individual portions of condiments; or various film or foil bags made to be torn open and not resealed, such as potato chip bags) a composition of the present invention may be incorporated into the sealant or gasketing material used to hold the package closed.

3) Likewise, the composition of this invention might be applied as a paint or as an article attached to the interior of the container, or as a tape or similar item protruding into or exposed to the interior of the package and mechanically held in place by the closing mechanism or technique.

4) There may be instances in which the oxygen scavenger compositions of the present invention must be separated from the product: in such cases the compositions may again be incorporated into an interior layer of a multilayer container.

5) The compositions of this invention may conveniently be combined with solutions to other manufacturing problems. For example, a common problem in plastics manufacturing today is to safely recycle previously-used plastic plastics into food-safe containers. Much recycled plastic may have been used as containers for random unknown materials, and the recycled plastics may therefore contain traces of materials not acceptable for food contact, and may also be composed of an admixture of plastics highly and minimally pervious to oxygen. Use of such recycled materials, combined with the compositions of this invention, as an inner layer in a multiple-layer container construction would allow much easier use of mixed-recycle materials.

It is further well known in the plastics manufacturing art to utilize concentrates or "master batches" of various sorts in the preparation of final mixtures of materials for eventual use in manufacturing finished articles. For instance, preparation and use of highly concentrated forms of oxygen control chemicals in carrier (e.g., PVC, plastisol, epoxy can coatings, gasketing, spray, roll-on, and dip coatings, and the like) may prove convenient in the manufacture of the composition which will eventually be used as final oxygen-scavenging compositions of this invention. The present invention lends itself readily to such practices, which are fully within the scope contemplated for the invention.

In these formulations, it is preferred to use an amount of oxygen scavenging compound ranging from about 0.1 to 20, preferably 1 to 12 parts by weight based on a 100 parts by weight of the polymer (i.e., between 10 and 1000, and preferably between 50 and 600 micromoles of scavenger compound per gram of polymer for compounds having molecular weights of between 200 and 500 grams per mole). When an ascorbate is used as a reducing agent, it is used in an amount of about 0.002 to 0.5 parts by weight based on 100 parts by weight of the polymer (i.e., between 0.1 and 10 micro-moles per gram of polymer).

When the ascorbate is used to augment the oxygen scavenging properties of the chelates it would be used in an amount of between about 0.3 and 33 and preferably, 2.5 to 15 parts per weight based on 100 parts by weight of the polymer (i.e, between 10 and 500, and preferably 50 to 300 micromoles per gram of polymer).

In another embodiment of the invention, the oxygen scavenging compositions may be treated to maintain these agents in a dry state before they are dispersed relatively uniformly throughout the polymer. Numerous methods are known for maintaining this dry state, and freeze drying, spray drying, or microencapsulation are preferred due to simplicity of processing. Thereafter, the oxygen scavenging composition will be activated by contact with water or water vapor which permeates into the polymer. Techniques for freeze drying and microencapsulation are well known in the art, and one skilled in the art can select the appropriate encapsulant for the intended application. By such appropriate selection of the encapsulating material, one may protect the enclosed oxygen scavenging compound from the oxygen in air; this would allow longer storage of the prepared oxygen scavenger. After freeze drying, spray drying, or microencapsulation, the materials are then blended with the appropriate carrier and manufactured into the final composition, form and configuration for use in, on or as the product packaging.

By way of example, one way of distributing the oxygen scavenging material throughout a carrier is by preparing direct blend polymers, either as "master batch" concentrates or as final product. For preparation of a concentrate or "master batch" which will be diluted during manufacture of the final compositions, very high weight percentages of oxygen scavenging ingredients (up to, e.g., 75–90%) may be used. Beads of a polymer carrier, such as polyvinyl chloride, are placed between the rollers of a polymer forming mill operating at about 300° F. The back roller of the mill operates at a higher velocity than the front roller. The rollers spin in opposite directions, so that the beads are sheared downward therebetween. As the polymer beads become fluid they spread across the front roller at the thickness set between the rollers.

After the PVC has become heated and softened, the oxygen scavenging compounds to be blended into the polymer are slowly poured into the space between the rollers. The mixing of PVC and compound is then achieved by cutting the polymer to the center of the mill and then allowing it to spread back out over the roller. This is done 20–30 times until the compounds are well mixed. The mixing may also be done in the standard ways of commercial preparation of various plastic formulations, e.g. by simple addition of oxygen absorbing materials of the invention as an additional ingredient during bulk "dry mixing" of PVC, plasticizer, and other components.

EXAMPLES

The following examples illustrate preferred embodiments of the invention. In each example, the formulation components are designated in parts by weight unless otherwise indicated.

EXAMPLE 1

A known weight (generally 1 gram) of polymer or material to be tested is introduced into a 250 ml gas sampling tube. New O-ring seals and septum are used for each specimen. The gas tube is then flushed with the standard gas until the tube is filled with the standard gas. The gas tube is allowed to sit 1 hour and then is connected to the system. Two or three samples of gas are loaded from the tube into the gas chromatograph. This is done to check for any leaks in the tube, which may have developed after filling, and to establish a baseline oxygen/nitrogen ratio. If the tube is stable and no leaks are detected, a specified amount of distilled water is introduced into the tube, generally 0.5–1 ml. The gas mixture in the tube is sampled periodically, loaded onto the gas chromatograph and evaluated for oxygen content with a mass selective detector.

To demonstrate the unexpected advantages of the present invention, the following compositions were prepared and tested as noted above. Experimental oxygen scavenging polymeric compounds of this invention were prepared in one of two ways. For purposes of screening compounds, a PVC dry blend containing the oxygen scavenging material was prepared using techniques known to one skilled in the art. This dry blend was then fused and sheeted out into a film 0.035 inches ±0.05 inches thick on a two roller rubber mill at 300°–340° F. Samples were then cut and weighed from this sheet for introduction into the gas sampling tubes for oxygen uptake measurements.

Compounds showing exceptional activity were prepared by a second method for confirmation. This method involved making a dry blend, extruding the dry blend and molding the extrudate into a crown liner as described above in the specification.

$O_2$ uptake activity was measured by removing the liner from the metal shell, placing it into the gas sampling tube, and monitoring as described above with a gas chromatograph/mass selective detector.

Salicylic acid is a strong chelator for $Fe^{+++}$ (and less so for $Fe^{++}$): the iron of the "chelated $Fe^{+++}$" form will rapidly oxidize in the presence of oxygen. Consequently, an iron complex of salicylic acid (or a salt thereof) is useful in practicing the present invention. The $Fe^{+++}$ (salicylic acid)$_3$ complex is only slightly soluble in aqueous solutions. Consequently, the salicylic acid complex should yield lower rates of leach from container or gasket materials (wherein they are incorporated) into the contained products. The use of this oxygen-scavenging material would be preferred when one consideration is to minimize the leaching of package components into package contents.

Furthermore, it is preferable to utilize the $Fe^{+++}$ (salicylic acid)$_3$ complex in combination with an ascorbate as detailed above, so that the transition metal ions from the complex can serve to catalyze the aerobic oxidation of the ascorbate, and/or the ascorbate can reduce the oxidation state of the ferric ion.

The following experiment illustrates the utility of this combination.

120 μmole/(gram finished plastic) of {$Fe^{+++}$ (salicylic acid)$_3$} and 200 μmole/(gram finished plastic) of {sodium ascorbate} were blended together into PVC crown lining materials in accordance with techniques known in the art and as described above.

The resulting plastic material was used to form completed, lined crowns using standard ZapatA crown making machinery. To test for oxygen uptake capacity, completed liners were then removed from crown shells, wetted with 8% ethanol beer simulant, and placed in glass test chambers filled with air. Oxygen absorption was measured across time as change in % oxygen in the air in test chambers as noted above. Results are as follows:

| Liner | μMoles O₂ Absorbed (normalized to "per gram of liner") at Hour 3 | μMoles O₂ Absorbed (normalized to "per gram of liner") at Hour 27 |
|---|---|---|
| A | 14.0 | 28.6 |
| B | 10.5 | 26.7 |
| C | 10.5 | 26.1 |

To attain the desired combination of characteristics (e.g., low leach rate plus high oxygen absorption potential), certain obvious modifications to simple salicylate salts/complexes suggest themselves. For instance, leach rates might be appreciably lowered by chemically modifying the salicylic complex to be more hydrophobic, hence, less soluble in aqueous media. Certain of these modifications are included in the formulae for suitable salicylic acid derivatives described above.

While it is apparent that the invention herein disclosed is well calculated to fulfill the objects above stated, it will be appreciated that numerous modifications and embodiments may be devised by those skilled in the art, and it is intended that the appended claims cover all such modifications and embodiments as fall within the true spirit and scope of the present invention.

What is claimed is:

1. A package for a product comprising: means for supporting or retaining the product; and an oxygen scavenging composition for reacting with oxygen after activation with water or water vapor; said oxygen scavenging composition being in contact with the product or with the environment between the product and the package for scavenging oxygen therefrom, so as to avoid or reduce detrimental effects of oxygen upon the performance, odor or flavor properties of the product; said oxygen scavenging composition consisting essentially of a polymer carrier which is permeable to both oxygen and water or water vapor and an oxygen scavenging material of a transition metal chelate or complex of a salicylic acid or a salt thereof, and an ascorbate compound; the oxygen scavenging material and the ascorbate compound being, dispersed relatively uniformly throughout the carrier in an amount effective to act as an oxygen scavenger, wherein the salicylic acid transition metal chelate or complex is activated for scavenging oxygen by contact with water or water vapor which is present in or permeates through or into the carrier, and wherein the salicylic acid transition metal chelate or complex is present in an amount of about 0.01 to 20 parts by weight based on 100 parts by weight of the polymer carrier, and the ascorbate compound is present in an amount of about 0.001 to 33 parts by weight based on 100 parts by weight of the polymer carrier.

2. The package of claim 1 wherein the oxygen scavenging composition is present on an inside surface of said product supporting or retaining means.

3. The package of claim 1 wherein the product supporting or retaining means comprises a polymer in the form of a film.

4. The package of claim 3 wherein the oxygen scavenging composition is dispersed relatively uniformly throughout said film.

5. A package for a product, comprising: means for retaining the product; an oxygen scavenging composition for reacting with oxygen after activation with water or water vapor; and a plurality of films with at least one layer of adhesive or binder therebetween; wherein at least one film is of a polymer; and further wherein said oxygen scavenging composition is present in or on at least one of said films or layers; said oxygen scavenging composition consisting essentially of a polymer carrier which is permeable to both oxygen and water or water vapor and an oxygen scavenging material of a transition metal chelate or complex of a salicylic acid or a salt thereof, and an ascorbate compound; the oxygen scavenging material and the ascorbate compound being dispersed relatively uniformly throughout the carrier in an amount effective to act as an oxygen scavenger, wherein the salicylic acid transition metal chelate or complex is activated for scavenging oxygen by contact with water or water vapor which is present in or permeates through or into the carrier, and wherein the salicylic acid transition metal chelate or complex is present in an amount of about 0.01 to 20 parts by weight based on 100 parts by weight of the polymer carrier, and the ascorbate compound is present in an amount of about 0.001 to 33 parts by weight based on 100 parts by weight of the polymer carrier.

6. A package for a product comprising: means for supporting or retaining the product; and an oxygen scavenging composition for reacting with oxygen after activation with water or water vapor; said oxygen scavenging composition being in contact with the product or with the environment between the product and the package for scavenging oxygen therefrom, so as to avoid or reduce detrimental effects of oxygen upon the performance, odor or flavor properties of the product; said oxygen scavenging composition consisting essentially of a polymer carrier which is permeable to both oxygen and water or water vapor and an oxygen scavenging material of a transition metal chelate or complex of a salicylic acid or a salt thereof, and an ascorbate compound; the oxygen scavenging material and the ascorbate compound being dispersed relatively uniformly throughout the carrier in an amount effective to act as an oxygen scavenger, wherein the salicylic acid transition metal chelate or complex is activated for scavenging oxygen by contact with water or water vapor which is present in or permeates through or into the carrier, and wherein the salicylic acid salt is selected from the group consisting of:

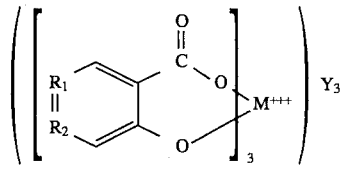

wherein
Y=Na, K or Ca,
M=a transition metal, and
$R_1$ and $R_2$ are carbon atoms or part of a benzene ring, and wherein the chelate or complex is present in an amount of about 0.01 to 20 parts by weight based on 100 parts by weight of the polymer carrier, and the ascorbate compound is present in an amount of about 0.3 to 33 parts by weight based on 100 parts by weight of the polymer carrier.

7. A container for a water-containing foodstuff, beverage, chemical or pharmaceutical product comprising: means for retaining the product and having at least one opening therein for filling or dispensing of the said product; a member for closing the opening and preventing escape of the product when not desired; and a liner or gasket comprising an oxygen scavenging composition being positioned adjacent the closing member, wherein the water or water vapor for activating said oxygen scavenging compositions is part of or derived from the product; said oxygen scavenging composition consisting essentially of a polymer carrier which is permeable to both oxygen and water or water vapor and an oxygen scavenging material of a transition metal chelate or complex of a salicylic acid or a salt thereof, and an ascorbate compound; the oxygen scavenging material and the ascorbate compound being dispersed relatively uniformly throughout the carrier in an amount effective to act as an oxygen scavenger, wherein the salicylic acid transition metal chelate or complex is activated for scavenging oxygen by contact with water or water vapor which is present in or permeates through or into the carrier, and wherein the salicylic acid transition metal chelate or complex is present in an amount of about 0.01 to 20 parts by weight based on 100 parts by weight of the polymer carrier, and the ascorbate compound is present in an amount of about 0.001 to 33 parts by weight based on 100 parts by weight of the polymer carrier.

8. A container for a dry foodstuff, beverage, chemical or pharmaceutical product comprising: means for retaining the product and having at least one opening therein for filling or dispensing of the said product; a member for closing the opening and preventing escape of the product when not desired; and a liner or gasket comprising an oxygen scavenging composition being positioned adjacent the closing member, wherein the water or water vapor for activating said oxygen scavenging composition is separately applied to said composition before the package is sealed; said oxygen scavenging composition consisting essentially of a polymer carrier which is permeable to both oxygen and water or water vapor and an oxygen scavenging material of a transition metal chelate or complex of a salicylic acid or a salt thereof, and an ascorbate compound; the oxygen scavenging material and the ascorbate compound being dispersed relatively uniformly throughout the carrier in an amount effective to act as an oxygen scavenger, wherein the salicylic acid transition metal chelate or complex is activated for scavenging oxygen by contact with water or water vapor which is present in or permeates through or into the carrier, and wherein the salicylic acid transition metal chelate or complex is present in an amount of about 0.01 to 20 parts by weight based on 100 parts by weight of the polymer carrier, and the ascorbate compound is present in an amount of about 0.001 to 33 parts by weight based on 100 parts by weight of the polymer carrier.

9. The container of claim 7 or 8 wherein the retaining means is a can, jar or bottle, the closing member is a closure, and the carrier for the oxygen scavenging composition of the liner or gasket is a polymer selected from the group consisting of a polyurethane, polyvinyl chloride, ethylene vinyl acetate, polyethylene, chlorinated polyethylene, a polyurethane and combinations thereof.

10. The container of claim 7 or 8 wherein the retaining means is a bottle, the closing member is a crown and the polymer of the liner or gasket is selected from the group consisting of a polyurethane, polyvinyl chloride, ethylene vinyl acetate, polyethylene, chlorinated polyethylene and a polyurethane.

11. The container of claims 7 or 8 wherein the closing member is made of aluminum, steel or plastic.

12. A container in accordance with claim 7 or 8, wherein the container comprises means for retaining a product, means for closing said container and retaining said product therein, and said oxygen scavenging composition is applied to or upon said closing means or is placed within the container.

13. A container in accordance with claim 7 or 8, wherein the container is a metal can or a plastic bag having a seam and said oxygen scavenging composition is applied to the seam as a sealant to prevent oxygen ingress into said container through said seam.

14. A container in accordance with claim 7 or 8, wherein said member for closing the opening is made from said oxygen scavenging composition.

15. The container of claim 7 or 8 wherein the retaining means is a can or jar, the closing member is a lid, and the oxygen scavenging composition comprises or is applied to the lid.

16. The container of claim 32 wherein the oxygen scavenging composition is applied to the lid in the form of a ring, a spot, a stripe, a coating or an attached article.

17. The container of claim 16 or 18 wherein the coating comprises a polymer or an epoxy compound.

18. The container of claim 7 or 8 wherein the retaining means is a can and the oxygen scavenging compound is applied as a coating on an interior surface thereof.

19. The container of claim 18 wherein the coating comprises a polymer or an epoxy compound.

20. A container in accordance with claim 7 or 8, wherein said container is made of said oxygen scavenging composition.

21. The container of claim 20, wherein the carrier is a polymer selected from the group consisting of a polyurethane, polyethylene, polypropylene, polyvinyl chloride, ethylene vinyl acetate, chlorinated polyethylene, polyethylene terephthalate and combination thereof.

* * * * *